United States Patent
Kempf et al.

(10) Patent No.: US 7,925,027 B2
(45) Date of Patent: Apr. 12, 2011

(54) SECURE ADDRESS PROXYING USING MULTI-KEY CRYPTOGRAPHICALLY GENERATED ADDRESSES

(75) Inventors: James Kempf, Mountain View, CA (US); Craig B. Gentry, Mountain View, CA (US)

(73) Assignee: NTT DoCoMo, Inc., Tokyo (JP)

(*) Notice: Subject to any disclaimer, the term of this patent is extended or adjusted under 35 U.S.C. 154(b) by 1389 days.

(21) Appl. No.: 11/377,589

(22) Filed: Mar. 16, 2006

(65) Prior Publication Data
US 2006/0248230 A1 Nov. 2, 2006

Related U.S. Application Data

(60) Provisional application No. 60/677,138, filed on May 2, 2005.

(51) Int. Cl.
- *H04K 1/00* (2006.01)
- *H04N 7/167* (2006.01)
- *H04L 9/00* (2006.01)
- *H04L 9/08* (2006.01)
- *H04L 29/06* (2006.01)
- *H04L 9/32* (2006.01)
- *G06F 9/00* (2006.01)

(52) U.S. Cl. .......... 380/282; 380/30; 380/232; 380/240; 380/262; 713/56; 713/171; 726/12

(58) Field of Classification Search .................. 713/162, 713/156, 171; 380/162, 30, 232, 240, 262, 380/282; 726/12
See application file for complete search history.

(56) References Cited

U.S. PATENT DOCUMENTS

| 6,826,690 | B1 | 11/2004 | Hind et al. | |
|---|---|---|---|---|
| 7,134,019 | B2 * | 11/2006 | Shelest et al. | 713/170 |

(Continued)

FOREIGN PATENT DOCUMENTS
WO WO/2007/027241 3/2007

OTHER PUBLICATIONS

Montenegro, Gabriel; Castelluccia, Claude; "Crypto-Based Identifiers (CBIDs): Concepts and Applications"; ACM Transactions on Information and System Security, vol. 7, No. 1, Feb. 2004; pp. 97-127.

(Continued)

*Primary Examiner* — Nasser Moazzami
*Assistant Examiner* — Mohammad W Reza
(74) *Attorney, Agent, or Firm* — Haynes & Boone, LLP.

(57) ABSTRACT

A method allows Internet Protocol version 6 (IPv6) nodes that use Mobile IPv6 for mobility management, or DHCP for address provisioning, to securely claim and defend their network addresses themselves or through proxies using the SEND protocol. The network node may also sign and verify a message that claims and defends a network address. The network address to be claimed and defended may be either autoconfigured or obtained from a server using the DHCPv6 protocol. If the MCGA is generated by a mobile IPv6 node as a mobile IPv6 home address, the MCGA can be securely proxied by the mobile IPv6 home agent after the mobile node has left the home link. However, if the MCGA is generated as a mobile IPv6 care-of address by a mobile IPv6 node while on a foreign subnet, the MCGA can be securely proxied by the current or new access router, before the mobile node arrives on the link and after it has left the link, respectively.

36 Claims, 3 Drawing Sheets

Configuration of an IPv6 MCGA using DHCPv6

U.S. PATENT DOCUMENTS

| | | | |
|---|---|---|---|
| 7,203,837 B2 * | 4/2007 | O'Shea et al. | 713/170 |
| 7,401,216 B2 * | 7/2008 | Arkko et al. | 713/153 |
| 7,493,652 B2 * | 2/2009 | Aura | 726/2 |
| 7,535,870 B2 * | 5/2009 | Nikander et al. | 370/331 |
| 2001/0016909 A1 | 8/2001 | Gehrmann | |
| 2001/0026619 A1 | 10/2001 | Howard, Jr. et al. | |
| 2002/0133607 A1 | 9/2002 | Nikander | |
| 2002/0152380 A1 | 10/2002 | O'Shea et al. | |
| 2002/0152384 A1 | 10/2002 | Shelest et al. | |
| 2003/0084293 A1 | 5/2003 | Arkko et al. | |

OTHER PUBLICATIONS

T. Aura; "Cryptographically Generated Addressed (CGA)", RFC 3972, Copyright The Internet Society Mar. 2005; pp. 1-19.

Johnson, David; Perkins, Charles; Arkko, Jari; "Mobility Support in IPv6", RFC 3775, Copyright The Internet Society, Jun. 2004; pp. 1-165.

Arkko, Jari; Kempf, James; Zill, Brian; Nikander, Pekka; Secure Neighbor Discovery (SEND), RFC 3971, Copyright The Internet Society, Mar. 2005; pp. 1-56.

Droms, Ralph; Bound, James; Volz; Bernie, Lemon; Ted, Perkins, Charles; Carney, Michael; "Dynamic Host Configuration Protocol for IPv6 (DHCPv6)"; RFC 3315, Copyright The Internet Society, Jul. 2003; pp. 1-101.

Koodli, Rajeev; "Fast Handovers for Mobile IPv6" RFC 4068; Copyright The Internet Society, Jul. 2005; pp. 1-40.

Droms, Ralph; Arbaugh, William; "Authentication for DHCP Messages" RFC 3118; Copyright The Internet Society, Jun. 2001; pp. 1-17.

Narten, Thomas; Nordmark, Erik; Simpson, William; "Neighbor Discovery for IP Version 6 (IPv6)"; RFC 2461; Copyright Internet Society, Dec. 1998; pp. 1-93.

Thomson, Susan; Narten, Thomas; "IPv6 Stateless Address Autoconfiguration"; RFC 2462; Copyright Internet Society, Dec. 1998; pp. 1-25.

Liebsch, Marco; Singh, Ajoy; Chaskar, Hemant; Funato, Daichi; Shim, Eunsoo; "Candidate Access Router Discovery (CARD)"; Sep. 2004; http://www.ist-daidalos.org/daten/publication/standardisation-docs/04-09-ietf-seamoby/d; pp. 1-43.

* cited by examiner

Configuration of an IPv6 MCGA using DHCPv6

Autoconfiguration of IPv6 MCGA

SECURE ADDRESS PROXYING USING MULTI-KEY CRYPTOGRAPHICALLY GENERATED ADDRESSES

CROSS-REFERENCE TO RELATED APPLICATIONS

The present application is related to and claims priority to U.S. Provisional Patent Application, entitled "Secure Address Proxying Using Multi-key Cryptographically Generated Addresses", Ser. No. 60/677,138, filed on May 2, 2005, which is assigned to the same Assignee as the present application. The present application is also related to a co-pending patent application ("Co-pending Application") entitled "Multi-key Cryptographically Generated Address," filed on the same day as the present application by the current inventors of the present application and assigned to the current Assignee of the same application. The Copending Application is hereby incorporated by reference herein in its entirety.

BACKGROUND OF THE INVENTION

1. Field of the Invention

The present invention relates to secure claim and defense of a network addresses for a node in a computer network. In particular, the present invention relates to secure claim and defense of a network address by a network node other than the one from which the network address originates.

2. Discussion of the Related Art

U.S. Patent Application Publication 2002/0133607, entitled "Address Mechanisms in Internet Protocol" (the "Nikander Application") discloses using a one-way coding function to generate an Internet Protocol (IP) address from one or more components specific to a host which claims the IP address. In the Nikander Application, a recipient of a message from the host reconstructs and checks the IP address using the components. The claiming host uses an authentication protocol or a public key cryptographic protocol to establish data integrity on the message, the tie between the components and the address.

U.S. Patent Application Publication 2002/0152384, entitled "Methods and Systems for Unilateral Authentication of Messages" (the "Schelest Application") discloses deriving an IP Version 6 (IPv6) address hashing the claiming host's public key. In the Schelest Application, a recipient of a message from the claiming host checks the hash of the IPv6 address, and checks a cryptographic signature in the message to verify its data integrity. If both the IPv6 address and the enclosed signature are verified, the recipient accepts the host's claim of ownership over the IPv6 address.

"Crypto-Based Identifiers (CBIDs): Concepts and Applications" (the "Montenegro Paper") by Gabriel Montenegro and Claude Castellucia, *ACM Transactions on Information and System Security*, Feburary, 2004, reviews the area of cryptographically generated identifiers and their use in establishing authorization to claim the right to use an address by a single host.

U.S. Patent Application Publication 2003/00849293, entitled "Addressing Mechanisms in Mobile IP" (the "Arkko Application") discloses an owner node delegating the responsibility for its IP address to a second node when the address is generated. In the Arkko Application, the IP address may be cryptographically generated using the methods disclosed in the Nikander or the Schelest Applications. Under the method of the Arkko Application, the owner node obtains a public key of a public/private key pair from the second node, and creates an authorization certificate by signing the obtained public key using the owner node's own private key. The authorization certificate is then provided to the second node, which may then distribute it in any message relating to the owner node's IP address. The second node signs this message, including the authorization certificate, with its private key. A recipient node uses the second node's public key to verify the message and the owner node's public key to verify the authorization certificate. The cryptographic hash of the address verifies the owner node's right to the address and the verified second node's public key in the authorization certificate establishes the second node's right to send messages on behalf of the owner node.

IETF Request for Comment (RFC) 3972, by Tuomas Aura, March 2005, discloses generating, cryptographically, an IPv6 address and securing the claim of authorization for the IPv6 address in the Neighbor Discovery Protocol (RFC 2461 and RFC 2462). The IPv6 address is generated using both the cryptographic hash of the public key of the owner node and additional information. 64 bits of cryptographic hash serves as the interface identifier of the IPv6 address.

U.S. Patent Application Publication 2002/0152380, entitled "Methods and Systems for Unilateral Authentication of Messages" (the "O'Shea Application") discloses using a public key for a single host, as described in the Schelest Application, to cryptographically generate a Mobile IPv6 home address and care-of address. The Mobile IPv6 home agent in the home network forwards to the care-of address data packets addressed to the home address, when the mobile node is located outside the home subnet. The mobile node may request that a correspondent node address packets directly to the care-of address, rather than through the home address, thus improving routing performance—a process called "binding update for route optimization." The signaling to optimize routing in this manner requires some proof that the mobile node is authorized to claim the new care-of address. The proof may be provided using the cryptographic properties of the network address and a public key signature on the signaling packets. The mobile node signs the binding update signaling packet with the private key corresponding to the public key used to generate the network address. The signaling packet is sent with the source address set to the new, cryptographically generated care-of address, Also included in the signaling packet are the cryptographically generated home address and the public key. Upon receiving the signaling packet, the correspondent node checks that the source address and home address can be generated from the included public key, and then checks the signature. If both the source address and the public keys match expectation, the correspondent node accepts the signaling packet.

RFC 3971, by Jari Arkko, James Kempf, Brian Zill, and Pekka Nikander, March 2005, discloses extending IPv6 Neighbor Discovery Protocol (described in RFC 2461 and 2462) for secure advertising and defending network addresses and for secure discovery of last hop IP routers. A node generates a cryptographically generated address according to an algorithm described in RFC 3972, and signs Neighbor Advertisement packets with an RSA signature. The Neighbor Advertisement packets claim ownership of the address. This claim is proved by the cryptographic property of the address, and the signature on the packet establishes data origin authentication on the packet. Thus, the receiving node can trust that the packet came from the claimed source address, and the message establishes authorization to claim the network address. The SEND protocol additionally allows for secure discovery of last hop routers. In RFC 3972, a format for a certificate on last hop routers is specified. A router possessing such a certificate signs Router Advertisement messages with the private key corresponding to its certified public key. A node seeking a last hop router obtains the router's certificate and a certificate chain leading back to a commonly shared trust root from the router. The node uses the router's certified key to verify the signature on the Router Advertisement, thereby obtaining a certified last hop router.

As can be seen from the above, the Nikander and Schelest Applications, the Montenegro Paper, RFC 3927 and RFC 3971 relate only to cases in which authorization to use the network address is claimed by a single host. Often, however, it may be necessary to authorize one or most hosts to use an address. Some examples can be found in Mobile IPv6 networks and DHCP applications In a Mobile IPv6 network, a mobile node may be reached using a home address on a home network to which the mobile node is assigned. The home address does not change regardless of where the mobile node is on the Internet. When the mobile node is in a remote subnet outside of its home subnet, a "home agent" (e.g., a router on the mobile node's home subnet) forwards messages addressed to the home address to a "care of" address, which is a local address in the remote subnet. To prevent the home address from claim by another when the mobile node is away from the home network, the home agent must proxy, or defend, the mobile node's home address. However, if the mobile node generates the home address using a cryptographic identifier tied to its public key, only it can securely defend the home address. The proxy defense by the home agent must be done without security.

A similar problem exists for the mobile IPv6 care-of address, when the mobile node is using the Fast Mobile IPv6 (FMIPv6) protocol to optimize handover. During such a handover, the mobile node's old care-of address on the old access router or a new care-of address on the new access router may, for a time, need to be defended, when the mobile node is outside of either subnet. During this time, the mobile node's traffic packets are forwarded between access routers so that the packets are not lost. The access router must proxy the address on behalf of the mobile node, but cannot proxy the address securely using existing techniques.

Under the IPv6 Neighbor Discovery Protocol, even when a host's address is obtained from a Dynamic Host Configuration Protocol (DHCP) server, the host is still required to claim and defend that address on the network. However, such claim and defense cannot be done securely using cryptographically generated addresses because the address is generated by the DHCP server without the host's public key. Nor can the host sign with its private key a message relating to the address, as the host did not generate the address.

While the Arkko Application discloses an owner node delegating advertising and defense of its address to another party, the solution in the Arkko Application is cumbersome. In the Arkko Application, in addition to using both the owner node's and the delegated node's public keys, an attribute certificate is also required. After generating the address, the attribute certificate is sent by the owner node to the delegated node. As described in the Arkko Application, the solution in the Arkko Application identifies whether the claimant is the owner node or the delegated node. This information can be used by an attacker to infer the location or other information about the owner host.

SUMMARY

According to one aspect of the present invention, a method for allows secure proxying of a network address. In one embodiment, a DHCP server receives from a DHCP client a request for the network address. The DHCP client includes in the request a public key of the DHCP client. Using this public key and a public key of the DHCP server, a multi-key cryptographically generated address (MCGA) is created. This MCGA is returned to the DHCP client. In one embodiment, the DHCP server caches the network address and the public key of the DHCP client.

According to another aspect of the present invention, a secure protocol is created to allow a soliciting node to verify the authority of a node possessing an address by checking the node's network address using the public keys that are used to generate the network address. In addition, the node possessing the address includes in its request a signature signed using a private key corresponding to the public key used to create the network address. The signature may be a ring signature formed using all the public keys that form the network address. Alternatively, the signature may be a conventional public key signature which belongs to one of other signers; in that case, the message also indicates which public key corresponds to the private key that is used to create the signature.

The present invention also provides a method which allows a router to proxy a network address. The method includes creating the network address from a public key of the mobile node and a second public key, and sending a message to the router to request proxying of the network address. In one embodiment, the second public key is a public key of the router. The message comprises a binding update message to a home agent in the router. Alternatively, the second public key may be a public key of a prospective router. In that instance, the network address corresponds to a prospective care-of address, which is to be proxied by the first router until the mobile node moves into a link with the second router.

According to one embodiment of the present invention, the network address may be autoconfigured by the mobile node. Alternatively, the network address may be created by a DHCP server. The mobile node creating the network address may obtain the public key of the router using a suitable protocol. Examples of suitable protocols include the SEND protocol and the CARD protocol, or an extension to IPv6 router discovery for per mobile node key. The router may obtain the mobile node's public key by having the mobile node include the public key in the message requesting proxying.

In one embodiment, a DHCP server is co-located with the router on which a home agent resides, and the network address is a MCGA generated using a public key of the mobile node and the common public key of the DHCP and the home agent.

The present invention also provides a method for a network node to securely claim and defend a network address. In one embodiment, the method includes receiving an address resolution request for a network address, which is formed from multiple public keys, one of which being a public key of the network node. The method responds to the address resolution request by sending a message to the sender of the address resolution request, enclosing in the message those multiple public keys. The sender of the address resolution request checks the network address using the plurality of public keys received, and verifies a signature on the message, signed using a private key of the network node.

Thus, the present invention allows IPv6 nodes that use Mobile IPv6 for mobility management or DHCP for address provisioning to securely claim and defend addresses themselves or through proxies using, for example, the SEND protocol.

The present invention is better understood upon consideration of the present invention and the accompanying drawings.

DETAILED DESCRIPTION OF THE PREFERRED EMBODIMENTS

The present invention allows Internet Protocol version 6 (IPv6) nodes that use mobile IPv6 for mobility management, or DHCP for address provisioning, to securely claim and defend their network addresses themselves or through proxies using the SEND protocol. For example, according to one embodiment, an IPv6 network node generates or obtains a multi-key cryptographically generated IPv6 address (MCGA) using any suitable method described in the Copending Application incorporated by reference above. The network node may also sign and verify a message for claiming and defending a network address under the SEND protocol. The network address to be claimed and defended may be either autoconfigured or obtained from a server using the DHCPv6 protocol. If the MCGA is generated by a Mobile IPv6 node as a Mobile IPv6 home address, the MCGA can be securely proxied by the Mobile IPv6 home agent after the mobile node has left the home link. However, if the MCGA is generated as a Mobile IPv6 care-of address by a Mobile IPv6 node while on a foreign subnet, the MCGA can be securely proxied by the current or new access router, before the mobile node arrives on the link and after it has left the link, respectively.

Figure 1:
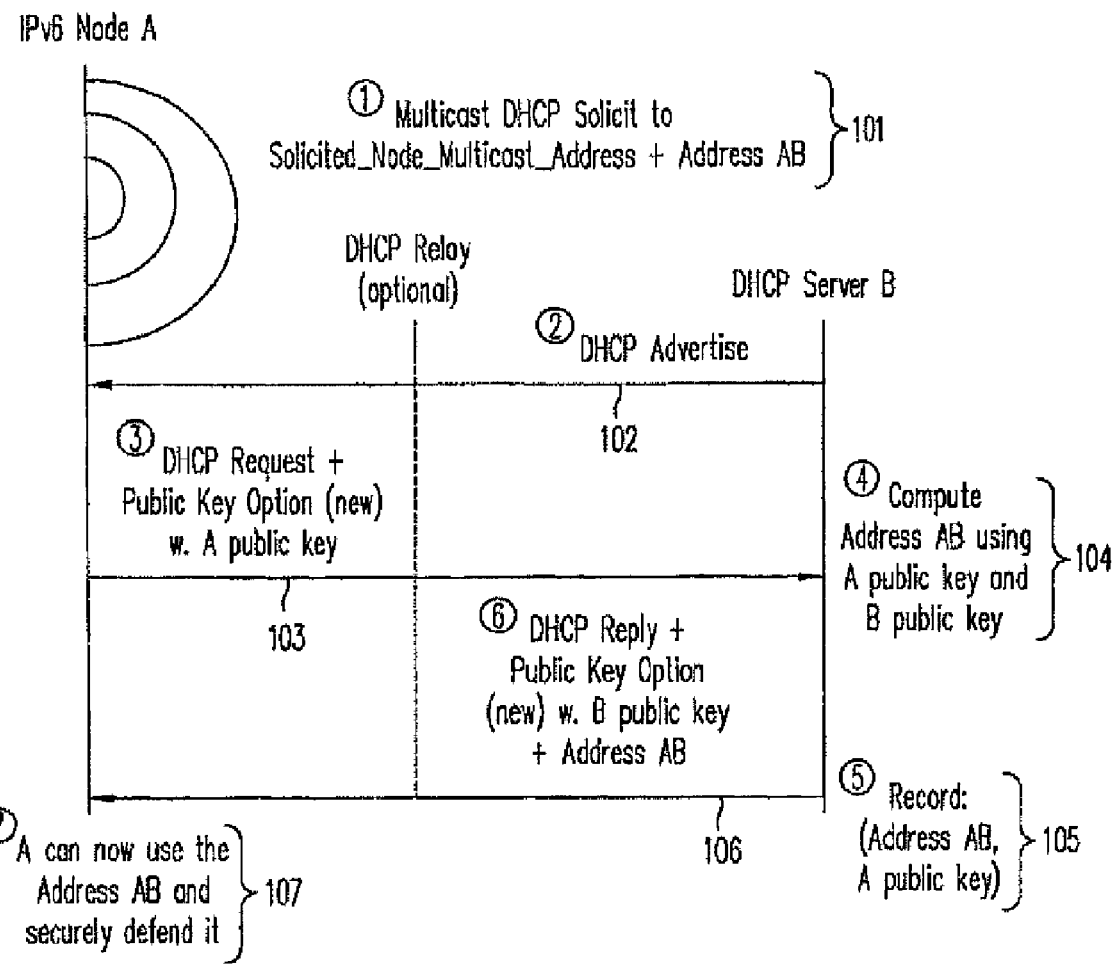
FIG. 1 shows using DHCP to obtain an MCGA from a DHCP server that a network node (e.g., IPv6 node) can securely claim and defend using the SEND protocol.

FIG. 1 shows using DHCP to obtain an MCGA from a DHCP server that a network node (e.g., IPv6 node) can securely claim and defend using the SEND protocol. As shown in FIG. 1, at step 101, to find a DHCP server, an IPv6 node (say, node A) multicasts a DHCP Solicit message to the IPv6 "All_DHCP_Relay_Agents_and_Servers" multicast address, in accordance with RFC 3315. In response, at step 102, a DHCP server (say, node B) or optionally, a Relay Agent communicating with node B, answers node A's DHCP Solicit message with a DHCP Advertise message. At step 103, in response to the DHCP Advertise message, node A sends a DHCP Request message to node B. The DHCP Request message includes A's public key in a new DHCP Address Public Key Option. At step 104, DHCP server B uses A's public key and its own public key (i.e., B's public key) to generate an MCGA ("address AB"). This MCGA may be generated, for example, using any suitable method described in the Copending Application or RFC 3972. At step 105, DHCP server B records the binding between address AB and A's public key for future reference. Thereafter, at step 106, DHCP server B sends address AB back to node A in a DHCP Reply message, in which node B also includes B's public key in a DHCP Address Public Key Option, At step 107, upon receiving the DHCP Reply message, node A can use address AB as a source address for IP traffic. Node A may also use A's public key, B's public key, and A's private key (which complements A's public key) to sign Neighbor Discovery messages, which securely claim and defend the network address, as described in further detail below. To prevent an attacker spoofing the Request/Reply exchange using A's public key, nodes A and B may deploy RFC 3118 Authentication for DHCP messages or delayed authentication as described in RFC 3315.

DHCP server B can also use the cryptographic properties of a network address to check whether an operation on the network address, such as a DHCP Renew, is authorized. For this purpose, node A includes A's public key in the message, and signs the message with A's private key. Before performing the requested operation, DHCP server B checks whether A's public key is a component of the network address and whether the signature verifies, as described in the Copending Application.

Figure 2:
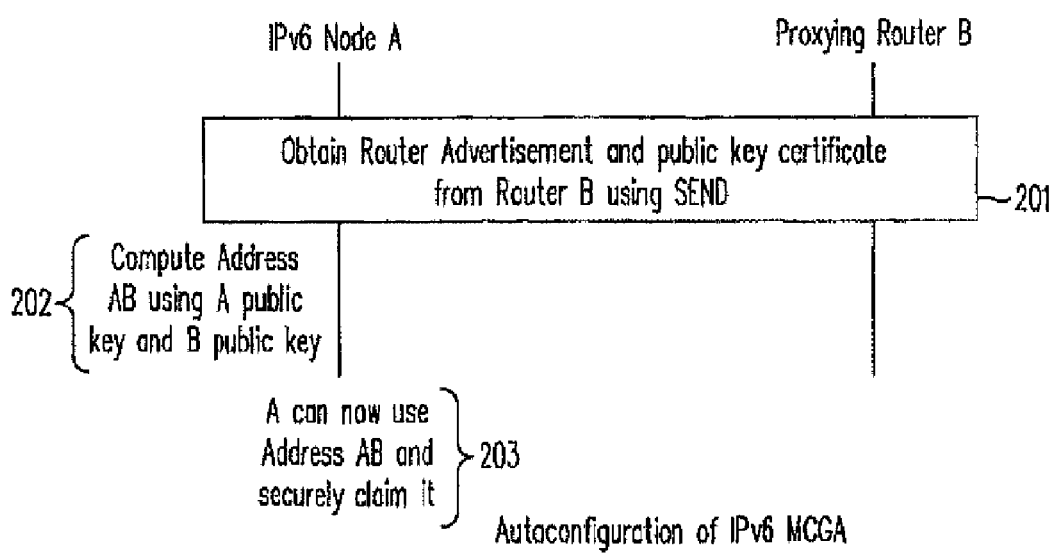
FIG. 2 illustrates a Mobile IPv6 mobile node autoconfiguring a MCGA that can be claimed and defended securely by a proxy (either a Mobile IPv6 home agent or an FMIPv6 access router) using SEND.

FIG. 2 illustrates a mobile IPv6 mobile node autoconfiguring a MCGA that can be claimed and defended securely by a proxy (either a Mobile IPv6 home agent or an FMIPv6 access router) using the SEND protocol. FIG. 2 shows an IPv6 node autoconfiguring the MCGA using its key and the key of a router (e.g., a Mobile IPv6 home agent or an FMIPv6 access router). Upon the IPv6 node's request, the router may act as its proxy. In accordance with RFC 3971, the IPv6 node A sends a Router Solicitation using the SEND protocol to the router (step 201). The router (i.e., node B) responds with a Router Advertisement message (step 202). The Router Advertisement message is signed with a ring signature constructed using the router's certified public key and a public key specifically generated for the mobile node (B's public key), and the signature is inserted into a SEND RSA Signature Option, as per RFC 3971. The source address of the Router Advertisement message is an IPv6 link local address generated as an MCGA. The router's certified public key and the B's public key are included in an extended SEND CGA Parameters Option from RFC 3792. In accordance with RFC 3971, node A obtains the router's certificate chain if node A does not already have it (step 203). Node A uses the certified public key and B's public key to verify the RSA ring signature on the Router Advertisement (step 204). Then node A constructs an MCGA (i.e., address AB) by concatenating A's public key with B's public key (step 205). An example of such an MCGA is described in the Copending Application incorporated by reference above. The use of a B's public key specifically generated for the mobile node prevents other nodes on the link from determining, by comparing the public keys used to generate the MCGA to the router's certified key, whether or not the mobile node is away from the link when the router is proxying.

Note that if node A is configuring an address for a link to which it is not yet attached (e.g., under FMIPv6), the SEND protocol cannot be used to obtain a public key certificate. In that event, node A may first obtain a public key certificate and specifically generated key for the access router (i.e., node B) using, for example, the CARD protocol.

Figure 3:
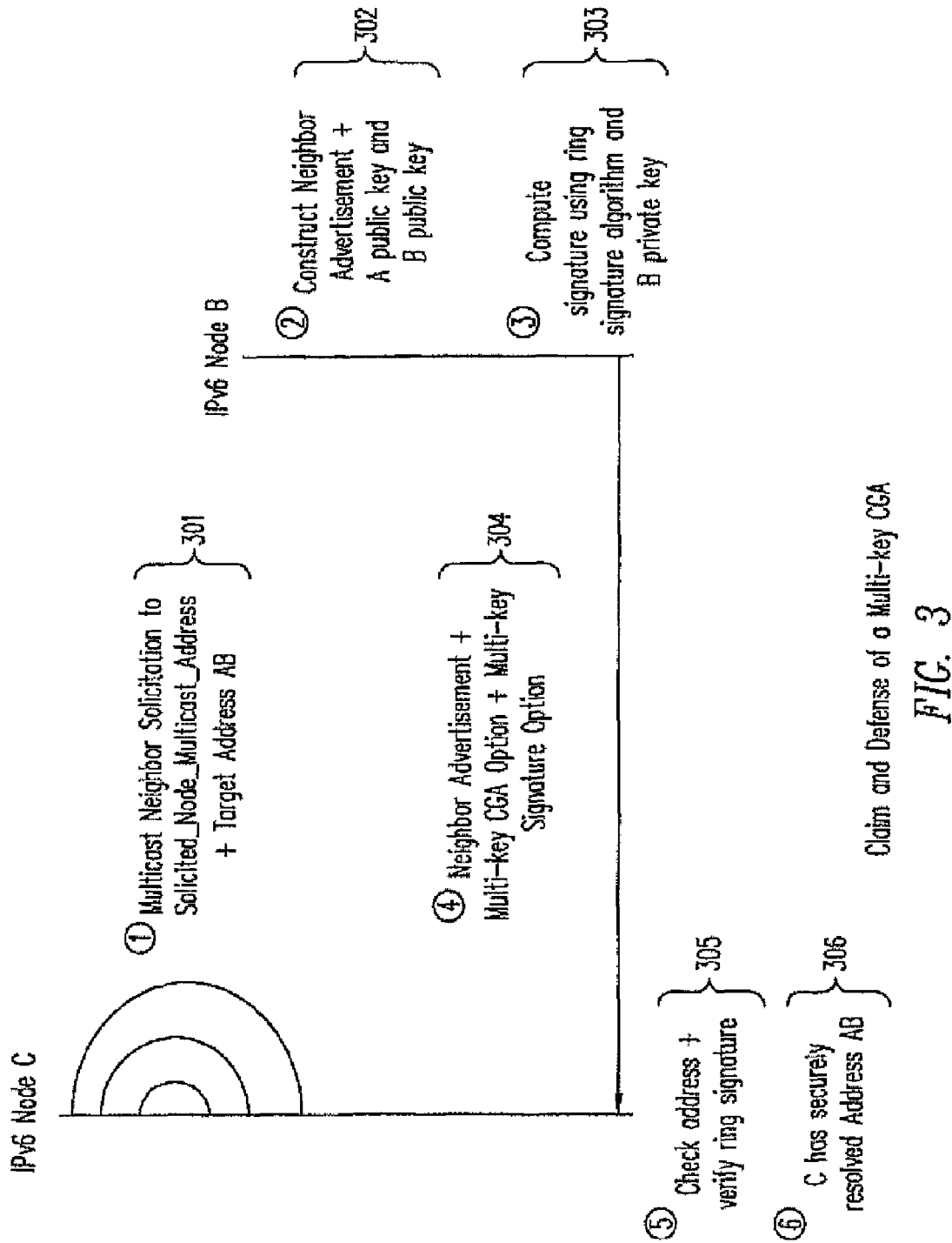
FIG. 3 illustrates a network device claiming and defending a MCGA using SEND.

Address AB may now be used and securely claimed (step 206). Each of nodes A and B may claim and defend the MCGA using a modification of the SEND protocol. FIG. 3 illustrates a protocol by which a network device may claim and defend address AB using the SEND protocol. As shown in FIG. 3, at step 301, an IPv6 node (say, Node C) on the link where address AB is being claimed requests a resolution of address AB to a link layer address. Note that node C may in fact be any node, including either one of nodes A and node B. Node A may request a resolution of address AB to detect a duplicate address, for example, under RFC 2462. As a router, node B may request resolution of address AB to route data traffic to node B. The request for resolution of address AB may be achieved by, for example, node C multicasting a Neighbor Solicitation message to the Solicited_Node_Multicast_Address, in accordance with RFC 2461 and RFC 3971. Address AB is included in the Neighbor Solicitation message as the target Address. The SEND messages for claim and defense include both public keys in an extended CGA Parameters option from RFC 3792 and a ring signature in the RSA Signature Option, from RFC 3791.

Any node whose public key is included in the address may answer node C's address resolution request. In FIG. 3, for example, node B answers at steps 302 and 303. At step 302, node B constructs a Neighbor Advertisement in accordance with RFC 2461 and RFC 3971. However, rather than using a standard cryptographically generated address (CGA) option, A's public key and B's public key are both inserted into a extended CGA Parameters Option in this Neighbor Advertisement message, along with other parameters used to generate the MCGA Address AB. At step 303, a signature is calculated on the Neighbor Advertisement message using B's private key. This signature may be, for example, a ring signature, or it may be a conventional public key signature created with the private key corresponding to B's public key, along with an indication in the message that the signature corresponds to B's public key. An example of a ring signature is described in the Copending Application incorporated by reference above. At step 304, node B includes the signature in the RSA Signature Option of the Neighbor Advertisement message sent to node C. At step 305, when node C receives the Neighbor Advertisement message, it checks address AB against the public keys in the CGA Parameters Option and verifies the signature in the RSA Signature Option using the public keys. The Copending Application discloses an exemplary method for checking such an MCGA and for verifying the signature. Upon a satisfactory check of the MCGA and successful verification of the signature, at step 306, node C accepts the Neighbor Advertisement message and thus has securely received a resolution of address AB.

Figure 4:
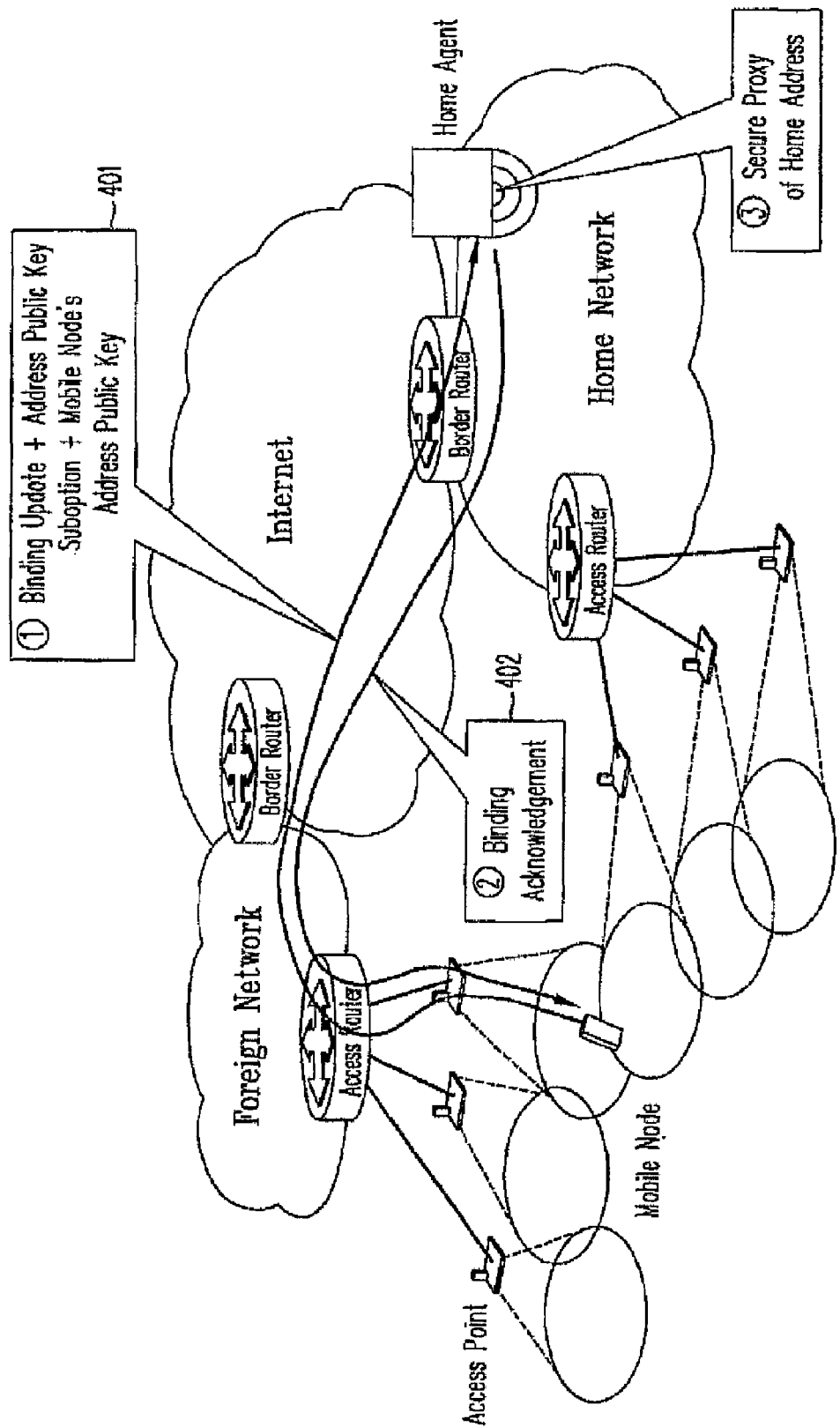
FIG. 4 illustrates a Mobile IPv6 mobile node requesting a home agent to start proxying the home address.

As only one node on a link can claim and defend a network address at any time, nodes A and B are required to co-ordinate with each other to determine which one of the two nodes is to claim and defend the address at any given time. FIG. 4 illustrates a Mobile IPv6 mobile node requesting a home agent to start proxying the home addrss of the Mobile IPv6.

Under Mobile IPv6 home agent address proxying, as illustrated by FIG. 4, if the mobile node (i.e., node A) is on the link, it claims and defends the address. According to RFC 3775, when the mobile node moves off the link, it sends a Binding Update message to the home agent, so as to bind its care-of address on the access network subnet to the home address. Upon receiving the Binding Update message, the home agent (i.e., node B) takes up claim and defense of the home address (i.e., address AB), which is an MCGA. In order for the home agent to claim and defend the home address, the home agent requires A's public key, which it may obtain using the address resolution procedure described above while node A is on the link. The public keys obtained are cached along with address AB. Alternatively, when node A reports its new care-of address in a Binding Update message (step 401 of FIG. 4), node A can send its public key in a new Address Public Key Mobility Suboption along with the Binding Update Option in the reporting message. From the time the acknowledgement message is sent at step 402 from the home agent (i.e., node B), the home agent securely claims and defend the home address (step 403).

Under the DHCP, node A (i.e., the IPv6 mobile node or other IPv6 node) is responsible for claiming and defending the network address until the address lease expires, unless the lease is renewed.

Under FMIPv6, if node A (i.e., the mobile node) knows prior to handover which subnet it will next occupy, node A sends a Fast Binding Update message to the current access router with the prospective care-of address. This prospective care-of address (i.e., address AB) is constructed using the public key of the new access router (i.e., node B) and A's public key. As described above with respect to FIG. 3, the public keys used may be provided in a new Address Public Key Suboption in the message reporting the care-of address. The current access router then signals the new access router (i.e., node B) with a Handover Initiate message containing the proposed address AB. If the new access router accepts address AB, the new access router securely claims and defends address AB until node A moves into the new link. When node A moves to this new link, node A sends a Fast Neighbor Advertisement message on the new link. Upon receipt of this message, the new access router stops proxying address AB.

Under FMIPv6, if node A does not know prior to handover which subnet it will next occupy, node A configures the new care-of address only after it has moved to the new link. The old care-of address (i.e., address AB) is constructed as a MCGA using the certified public key of the current access router (i.e., node B) and A's public key. Node A then signals the previous access router using a Fast Binding Update message, which contains the new care-of address, the old care-of address (i.e., address AB), and A's public key in a new Address Public Key Suboption. In accordance with the FMIPv6 protocol, upon receiving this Fast Binding Update message, the previous access router tunnels traffic received at the address AB to the new care-of address on the new subnet. The previous access router continues to securely claim and defend address AB until the tunnel lifetime expires.

If the IPv6 mobile host (i.e., node A) obtains address AB using DHCP, even though address AB is generated by the DHCP server, the mobile IPv6 home agent or the FMIPv6 access router can still be made a proxy for address AB. In one embodiment, to enable such proxying, the home agent or access router can be co-located with the DHCP server, so that both the DHCP server and the home agent or access router may share the same certified public key. In this instance, the DHCP server indicates its co-location with a home agent or access router by setting a flag in the DHCP Address Public Key Option. Alternatively, when mobile node (i.e., node A) requires proxying, node A sends both the DHCP server's public key and its own public key to the home agent or access router. In this instance, the flag in the DHCP Address Public Key Option is not set, node A sends two keys along with the binding update message or the fast binding update message when requesting proxying.

The above detailed description is provided to illustrate specific embodiments of the present invention and is not intended to be limiting. Numerous modifications and variations within the scope of the present invention are possible. The present invention is set forth in the accompanying drawings.

We claim:

1. A method for obtaining a network address for a network device, comprising:
   sending from the network device to a server a request for the network address, the request including a public key associated with the network device;
   receiving from the server the network address, the network address being generated using the public key of the network device and a public key associated with the server, wherein the network address received from the server expires after a predetermined term; and renewing the term of the network address by the network device sending the server a renewal request signed using a private key associated with the network device.

2. A method as in claim 1, further comprising using the network address as a source address in messages sent by the network device.

3. A method as in claim 1 wherein, between sending the request for the network address and receiving from the server the network address, the server and the network device exchange authentication messages.

4. In a server, a method for providing a network address to a network device, comprising:
receiving from the network device a request for the network address, the request including a public key associated with the network device;
sending the network device the network address, the network address being generated using the public key of the network device and a public key associated with the server, wherein the network address expires after a predetermined term; and
receiving a renewal request from the network device to renew the term of the network address, the renewal request being signed using a private key associated with the network device.

5. A method as in claim 4 wherein, between receiving the request for the network address and sending to the network device the network address, the server and the network device exchange authentication messages.

6. A method as in claim 4, further comprising verifying the signature of the network device in the renewal request.

7. A method as in claim 4, further comprising determining if the network address is formed using the public key of the network device.

8. In a mobile terminal, a method for generating a network address that can be defended by a proxy, comprising:
sending request to the proxy; receiving a reply from the proxy responding to the request, the reply including a public key associated with the mobile terminal and a signature associated with the mobile terminal;
creating the network address from the public key associated with the mobile terminal and a public key associated with the proxy, wherein the network address expires after a predetermined term; and
renewing the term of the network address by the mobile terminal sending the proxy a renewal request signed using a private key associated with the mobile terminal.

9. A method as in claim 8, wherein the signature in the reply comprises a ring signature corresponding to the public key associated with the proxy and the public key associated with the mobile terminal.

10. A method as in claim 8, wherein the signature in the reply comprises a conventional public key signature created using a private key corresponding to the public key associated with the mobile terminal included in the reply, and wherein the reply indicates the public key of the mobile terminal that is capable of verifying the signature.

11. A method as in claim 8 wherein the first public key associated with the proxy is a certified public key.

12. A method as in claim 8, further comprising receiving an address resolution request regarding the network address.

13. A method as in claim 8, further comprising requesting the proxy to become a home agent in a Binding Update message.

14. A method as in claim 13, further comprising receiving a request to claim the network address.

15. A method as in claim 13 wherein the Binding Update message is a Fast Binding update message.

16. A method as in claim 13 wherein the Binding Update includes a prospective network address.

17. In a proxy server, a method for providing a network address associated with a mobile terminal, comprising:
receiving a request from the mobile terminal, the request including a public key for the mobile terminal;
sending a reply to the mobile terminal responding to the request, the reply including a signature created using a public key of the mobile terminal;
receiving the network address from the mobile terminal, the network address being formed using the public key associated with the mobile terminal and the public key associated with the proxy, wherein the network address received from the mobile terminal expires after a predetermined term; and
renewing the term of the network address by receiving from the mobile terminal a renewal request signed using a private key associated with the mobile terminal.

18. A method as in claim 17, wherein the signature in the reply comprises a ring signature corresponding to the public key associated with the proxy and a public key associated with the mobile terminal.

19. A method as in claim 17, wherein the signature in the reply comprises a conventional public key signature created using a private key corresponding to the public key associated with the mobile terminal included in the reply, and wherein the reply indicates the public key of the mobile terminal that is capable of verifying the signature.

20. A method as in claim 17 wherein the first public key associated with the proxy is a certified public key.

21. A method as in claim 17 wherein the network address is received from the mobile terminal in a binding message requesting the proxy to become a home agent for the mobile terminal.

22. A method as in claim 21 wherein the binding update message is a fast binding update message.

23. A method as in claim 21 wherein the binding update includes a prospective network address.

24. A method as in claim 19, further comprising claiming the network address.

25. A method as in claim 24, further comprising receiving an address resolution request regarding the terminal address.

26. A method as in claim 25, further comprising responding to the address resolution request in a message signed using a private key associated with the proxy.

27. A system, comprising:
a network device which requests a network address from a server by providing the server a public key associated with the network device; and
a server which, upon receiving the request, generates the network address using the public key of the network device and a public key associated with the server and sends the network address to the network device, wherein the network address expires after a predetermined term, the network device renewing the term by sending to the server a renewal request signed using a private key associated with the network device.

28. A system as in claim 27, wherein the network device uses the network address as a source address in messages sent by the network device.

29. A system as in claim 28 wherein, prior to renewing the network address, the server determines if the network address is formed using the public key of the network device.

30. A system, comprising:
a network terminal; and
a proxy which, upon receiving a request from the network terminal, provides the network terminal with a public key associated with the network terminal, the public key associated with the proxy being provided to allow the network terminal to create a network address using a public key associated with the network terminal and the public key associated with the proxy, wherein the network address expires after a predetermined term, the network terminal renewing the term by sending to the proxy a renewal request signed using a private key associated with the network terminal.

31. A system as in claim 30, wherein the mobile terminal handles an address resolution request regarding the network address.

32. A system as in claim 30, wherein the proxy handles an address resolution request regarding the network address.

33. A system as in claim 30, wherein the proxy becomes a home agent to the mobile terminal upon receiving a binding update message.

34. A system as in claim 33 wherein the binding update message is a fast binding update message.

35. A system as in claim 33 wherein the binding update includes a prospective network address.

36. A system as in claim 32, wherein the proxy responds to an address resolution request in a message signed using a private key associated with the proxy.

* * * * *